Dec. 14, 1926.  
J. R. HENSEY, JR  
SUPPORTING HOOK  
Filed Sept. 30, 1925  
1,610,518

Inventor  
J. R. Hensey, Jr.

By Clarence A. O'Brien  
Attorney

Patented Dec. 14, 1926.

1,610,518

UNITED STATES PATENT OFFICE.

JAMES R. HENSEY, JR., OF MIDDLETOWN, OHIO.

SUPPORTING HOOK.

Application filed September 30, 1925. Serial No. 59,582.

This invention relates to supporting hooks primarily adapted for use in hanging a swing or hammock from the ceiling of a porch, room, or in fact from any desirable support in such a manner as to overcome the squeaking and grating that is now present in the hangers or other supports during the movement of the swing to and fro.

The primary object of the invention is to provide a hanger of this type wherein a constant supply of oil or other lubricant, is present between the frictionally contacting parts for the prevention of said swing structure squeaking or grating.

A further and important object is to provide a hanger embodying such features, the relatively few parts of which may be readily assembled for cleaning, repair, or renewal purpose.

Figure 1:
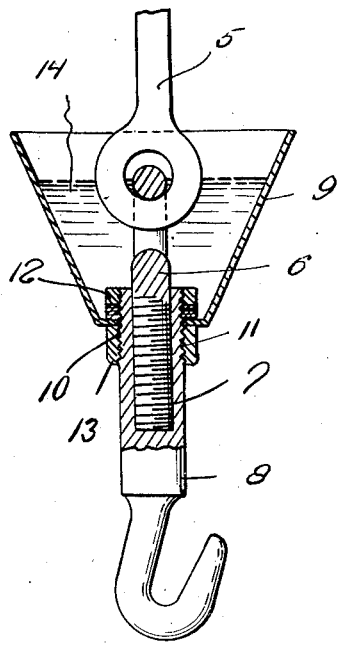
Figure 2:
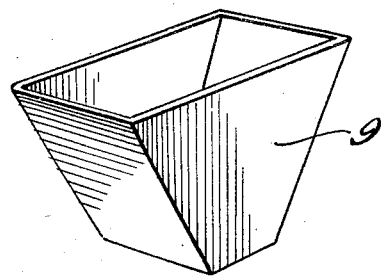

With the foregoing and other objects in view as the nature of the invention will be better understood from the following description when considered with the accompanying drawing:

Figure 1 is a view partly in side elevation and partly in cross section of my improved hanger, and Figure 2 is a perspective of the oil cup per se which constitutes an essential feature of the invention.

With particular reference to the drawing, there is fragmentarily shown a well known eye bolt 5, that is adapted at its screw threaded end to be threaded into the support being used. In interlocking relation with the eye end of said bolt 5 is the eyed end of a somewhat similar bolt 6, the lower threaded end of which is adapted for threaded engagement within the threaded socket 7 of a conventional form of hook bolt 8.

My improved hanger further constitutes the provision of an oil cup 9 of any desirable shape, but preferably of the shape as shown in the drawing. The bottom wall of the cup is formed with an opening 10 through which is engaged the upper end of the hook bolt 8 that is externally threaded at its upper end as at 11. For rigidly securing the cup to said hook bolt, nuts 12 and 13 interiorly and exteriorly of the cup are threaded upon the threaded end of the hook bolt and if desired suitable packing washers may be inserted between the opposed faces of the locking nuts and the bottom wall of the cup 9.

The cup is adapted to be supplied with a suitable amount of lubricant 14 which should be maintained at a level to completely submerge the contacting surfaces of the eye portions of the bolts 5 and 6, as per Figure 1.

The depth of the cup 9 should be such as to permit the oil level therein to be above the contacting areas of the eye portions of said bolts 5 and 6 without any liability of the oil being spilled from the cup during the rocking of the cup and its associated parts with respect to the eye bolt 5.

Minor changes may be made without departing from the spirit or scope of the appended claim.

Having thus described the invention, what I claim as new is:—

In a hanger of the class described, a pair of eye bolts, the eye portions of which are interconnected, an additional bolt, a hook formed on the lower end thereof, the upper end of said additional bolt being provided with an internally threaded socket for receiving a threaded portion of the lowermost of said eye bolts, an oil cup, the bottom thereof having an opening formed therein through which the upper portion of the additional bolt is adapted to extend, and lock nuts on the upper portion of the additional bolt and adapted to engage the opposite faces of the bottom of the oil cup, the interconnected portions of said eye bolts being adapted to be submerged in the oil in said cup.

In testimony whereof I affix my signature.

JAMES R. HENSEY, JR.